Dec. 26, 1939.   J. T. CAMPBELL   2,184,831
COMPENSATING DEVICE FOR COMBINATION NEGATIVES
Filed Nov. 4, 1938
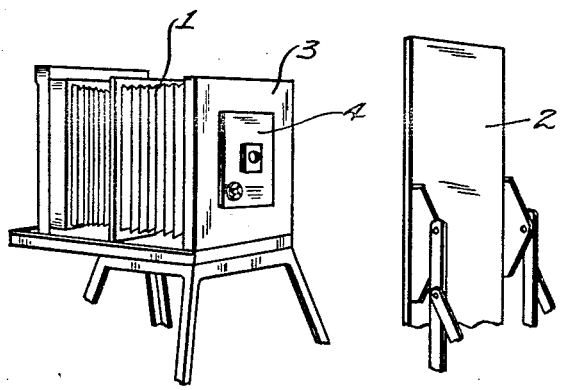
Fig. 1.
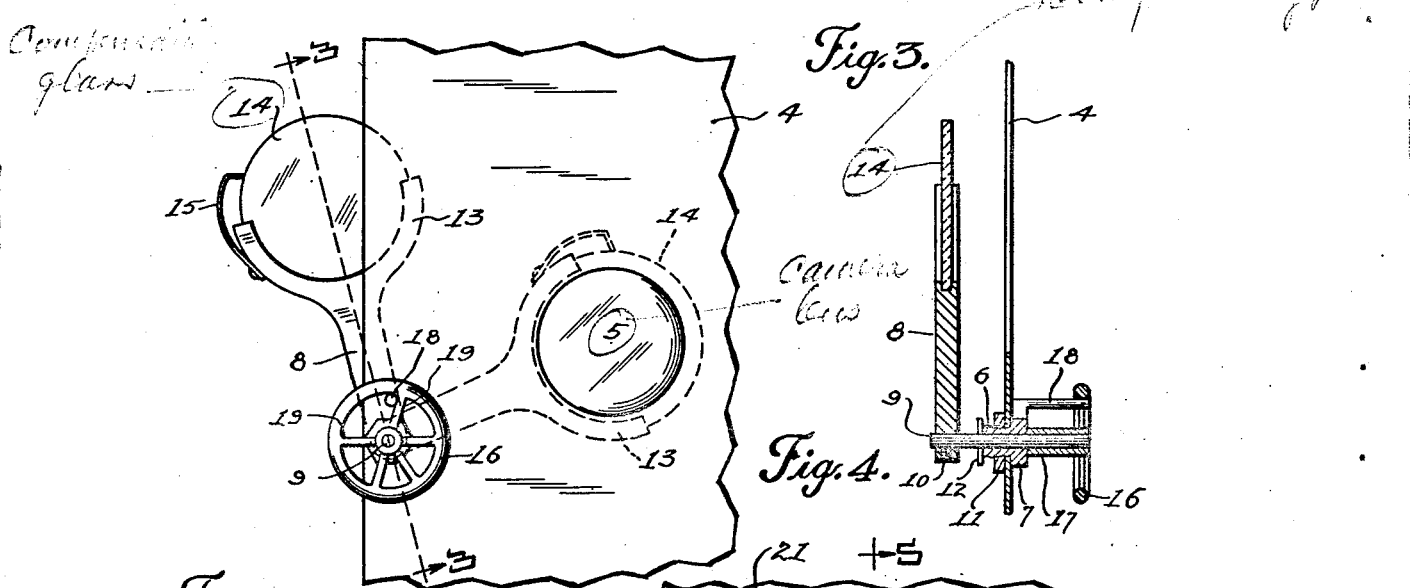
Fig. 2.
Fig. 3.
Fig. 4.
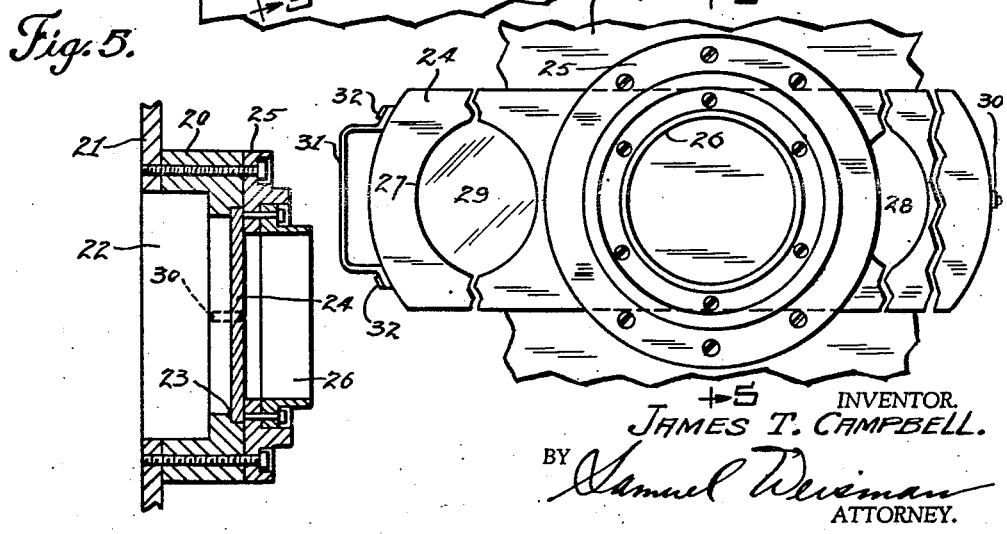
Fig. 5.
INVENTOR.
JAMES T. CAMPBELL.
BY Samuel Weisman
ATTORNEY.

Patented Dec. 26, 1939

2,184,831

UNITED STATES PATENT OFFICE 2,184,831

COMPENSATING DEVICE FOR COMBINATION NEGATIVES

James T. Campbell, Detroit, Mich., assignor to Douthitt Corporation, Detroit, Mich.

Application November 4, 1938, Serial No. 238,898

8 Claims. (Cl. 95—81)

The present invention pertains to a novel compensating device for combination half-tone and continuous line negatives.

In making such negatives, the exposure for the half-tone portion obviously requires the use of a half-tone screen. In making the continuous line portion of the negative, the screen is removed and replaced by a sheet of plate glass having substantially the same size and angle of refraction as the screen. Without such a glass, the half-tone and the continuous line portions of the negative would not be equally refracted and hence would not register accurately.

In the prior practice, the plate glass is inserted in the exact position of the removed screen which in turn is slightly larger than the negative. Consequently, large and cumbersome sizes of plate glass are kept in stock. They must be thoroughly cleaned before using, and if a speck of dust should remain, it shows up on the negative because of the close proximity of the glass to the negative.

The principal object of the present invention is to simplify the compensation for the screen with respect to both economy and manipulation. According to the invention, the compensating glass is mounted close to the camera lens where it need be only a fraction of the size of the glass presently used in the position of the removed screen. The smaller size is not only more economical but is more easily cleaned than the larger sizes. If some dirt should remain on the small glass, the effect thereof would be lost on the negative due to the comparatively long distance between the glass and negative, in which distance there is considerable diffusion of light. In addition, the small size of glass used according to this invention makes it economically possible to employ an especially high-grade of glass having properties resulting in better work. As another advantage of the invention, only one size of glass need to be stocked for each camera.

In the practical embodiment of the invention, the glass is preferably attached as an accessory to the camera and is manually movable into and out of working position. In some cameras, the glass may be mounted behind the lens, where it is fully protected, and moved by an external handle, while in other cameras, it is more feasible to mount the glass at the outer side of the lens board.

The invention is fully disclosed by way of example in the following description and the accompanying drawing in which:

Figure 1 is a perspective view of a conventional camera and easel, the camera being modified according to the invention;

Figure 2 is a detail front elevation of the lens board equipped according to the invention;

Figure 3 is a section on the line 3—3 of Figure 2;

Figure 4 is a fragmentary elevation of a lens board equipped with a modified form of the invention, and Figure 5 is a section on the line 5—5 of Figure 4.

Reference to these views will now be made by use of like characters that are employed to designate corresponding parts throughout.

In Figure 1 is shown a conventional bellows type camera 1 facing an easel 2 for supporting the object to be photographed. In the forward wall 3 of the camera is mounted the usual lens board 4 carrying a lens 5. A bushing 6 is passed through the board at some distance from the lens and is stopped against the forward face of the board by a shoulder 7. A bracket or frame 8 is secured on a shaft 9 passed through the bushing, preferably behind the board, by means of a set screw 10. A nut 11 screwed on the bushing 6 and engaging the rear face of the board 4 retains the bushing in position. A pin 12 is preferably passed through the shaft against the inner end of the bushing.

The free end of the frame 8 is in the form of an arc 13 in which is inserted a glass disk or lens 14. The distances from the center of the arc and from the center of the lens 5 to the shaft 9 are equal, so that the disk 14 may be swung to a position covering the lens, as illustrated in dotted lines in Figure 5.

The disks 14 may be retained in the arc 13 by a spring clip 15. On the outer end of the shaft 9 is mounted a hand wheel 16 preferably having a hub 17 engaging the forward end of the bushing 6. A finger 18 extends from the bushing between two of the spokes 19 of the wheel 16, to serve as a stop for retaining the frame 8 in the idle and operative positions illustrated in Figure 2.

When the negative is being exposed for half-tone work, the usual screen is used close to the negative. The glass 14 is set in the idle position shown in full lines in Figure 2. In making the continuous line exposure, the screen is removed in the usual manner, but instead of being replaced by a glass of equal size, the glass 14 is turned to the dotted line position behind the lens 5. Thus, the large compensating glass ordinarily used is here replaced by a considerably smaller glass disk which is only slightly larger than the lens opening. The disk 14 has the same refraction as the half-tone screen, or at least such refraction as to compensate for the refraction of the screen with respect to the negative.

Certain types of cameras, especially those having a small lens board, do not permit of a mounting such as shown in Figures 1, 2, and 3. In such cases, a cylindrical casting 20 is fastened to the forward face of the lens board 21 around the lens opening 22. The forward end of the casting 20 is milled at 23 to guide a shutter or glass carrier 24. To the forward end of the casting 20 is fastened a machined ring 25 which completes the guide for the member 24. The ring 25 receives a conventional lens flange 26 secured thereto in any suitable manner.

The carrier 24 is somewhat elongated and is formed with openings 27 and 28 adapted to register accurately with the lens flange 26. The openings are spaced apart sufficiently to permit the lens opening to be blocked by the intervening part of the shutter to shut out the light, as shown in Figure 4.

The opening 27 carries a glass disk 29 similar to the member 14 in Figure 2. This part of the carrier is moved into the lens opening when exposing for continuous line work. The unobstructed opening 28 is registered with the lens opening for the half-tone work. The latter adjustment is determined by a stop 30 on the corresponding end of the carrier 24 and adapted to engage against either part 20 or 26. The other end of the carrier is provided with a handle 31 which is formed with stops 32 for determining the position of the glass 29 in the lens opening.

It will be evident that this construction possesses all the advantages described in connection with Figures 2 and 3. In both cases, the compensating glass is in the form of an accessory to the camera and need not be carried from place to place, nor is a variety of sizes required. The small size of the glass reduces the cost considerably, and in fact makes possible the use of a preferred high grade of glass having qualities especially suited to the work. Because of its small size, the glass is easily cleaned, and even if some dirt should remain thereon, it will not seriously affect the negative because of the diffusion of light in the comparatively long distance between the glass and the object of being photographed.

The invention is used in making negatives for reproduction in photo-engraving, lithograph work, and kindred arts.

An analogous use of the invention is in the high lighting of half-tone negatives. After the negative has been exposed to the half-tone screen, the latter is removed and replaced by the compensating glass in the manner described, and then exposed again through the glass for a proper period of time. In the second exposure, the white areas of the object obliterate the dots in the corresponding areas of the negative before the remaining areas of the negative are materially affected.

Although a specific embodiment of the invention has been illustrated and described, it will be understood that various alterations in the details of construction may be made without departing from the scope of the invention, as indicated by the appended claims.

What I claim is:

1. A device of the character described comprising, in combination with a camera, a compensating glass mounted in close proximity to the camera lens and movable into and out of the light path through said lens, said glass being clear and having the same refractory effect as a half-tone screen used in the same camera, and being at least as large as said lens and substantially smaller than the exposure area in the camera.

2. A device of the character described comprising, in combination with a camera having a lens board and a lens, a movable support carried by said board, and a compensating glass carried by said support and movable into and out of the light path through said lens, said glass being clear and having the same refractory effect as a half-tone screen used in the same camera, and being at least as large as said lens and substantially smaller than the exposure area in the camera.

3. A device of the character described comprising, in combination with a camera having a lens board and a lens, a bracket pivotally attached to said board and swingable in a plane parallel to said board, and a compensating glass carried by said bracket, the centers of said lens and glass being equidistant from the pivotal axis of said bracket, whereby said glass may be swung into and out of the light path through said lens, said glass being clear and having the same refractory effect as a half-tone screen used in the same camera, and being at least as large as said lens and substantially smaller than the exposure area in the camera.

4. A device of the character described comprising, in combination with a camera having a lens board and a lens, a bracket pivotally attached to said board and swingable in a plane parallel to said board, and a compensating glass carried by said bracket, the centers of said lens and glass being equidistant from the pivotal axis of said bracket, whereby said glass may be swung into and out of the light path through said lens, and a stop for retaining said bracket in the position in which the glass covers said lens, said glass being clear and having the same refractory effect as a half-tone screen used in the same camera, and being at least as large as said lens and substantially smaller than the exposure area in the camera.

5. A device of the character described comprising, in combination with a camera having a lens board and a lens, a shutter mounted on said board to slide across said lens, a compensating glass mounted in said shutter, said shutter having a free opening, said glass and opening being adapted to register selectively with said lens, said glass being clear and having the same refractory effect as a half-tone screen used in the same camera, and being at least as large as said lens and substantially smaller than the exposure area in the camera.

6. A device of the character described comprising, in combination with a camera having a lens board and a lens, a shutter mounted on said board to slide across said lens, a compensating glass mounted in said shutter, said shutter having a free opening, said glass and opening being adapted to register selectively with said lens, the shutter having a solid portion between said glass and opening of sufficient size to obstruct said lens, said glass being clear and having the same refractory effect as a half-tone screen used in the same camera, and being at least as large as said lens and substantially smaller than the exposure area in the camera.

7. A device of the character described comprising, in combination with a camera having a lens board and a lens, a shutter mounted on said board to slide across said lens, a compensating glass mounted in said shutter, said shutter having a free opening, said glass and opening being adapted to register selectively with said lens, and stops on said shutter for determining the aforenamed registering positions, said glass being clear and having the same refractory effect as a half-tone screen used in the same camera, and being at least as large as said lens and substantially smaller than the exposure area in the camera.

8. A device of the character described comprising, in combination with a camera having a lens board and a lens, a shutter mounted on said board to slide across said lens, a compensating glass mounted in said shutter, said shutter having a free opening, said glass and opening being adapted to register selectively with said lens, the shutter having a solid portion between said glass and opening of sufficient size to obstruct said lens, and stops on said shutter for determining the aforenamed registering positions, said glass being clear and having the same refractory effect as a half-tone screen used in the same camera, and being at least as large as said lens and substantially smaller than the exposure area in the camera.

JAMES T. CAMPBELL.